June 26, 1928.
W. MACGREGOR
1,674,693
PORTABLE FOLDING FIRE MONITOR STAND
Filed Oct. 27, 1925
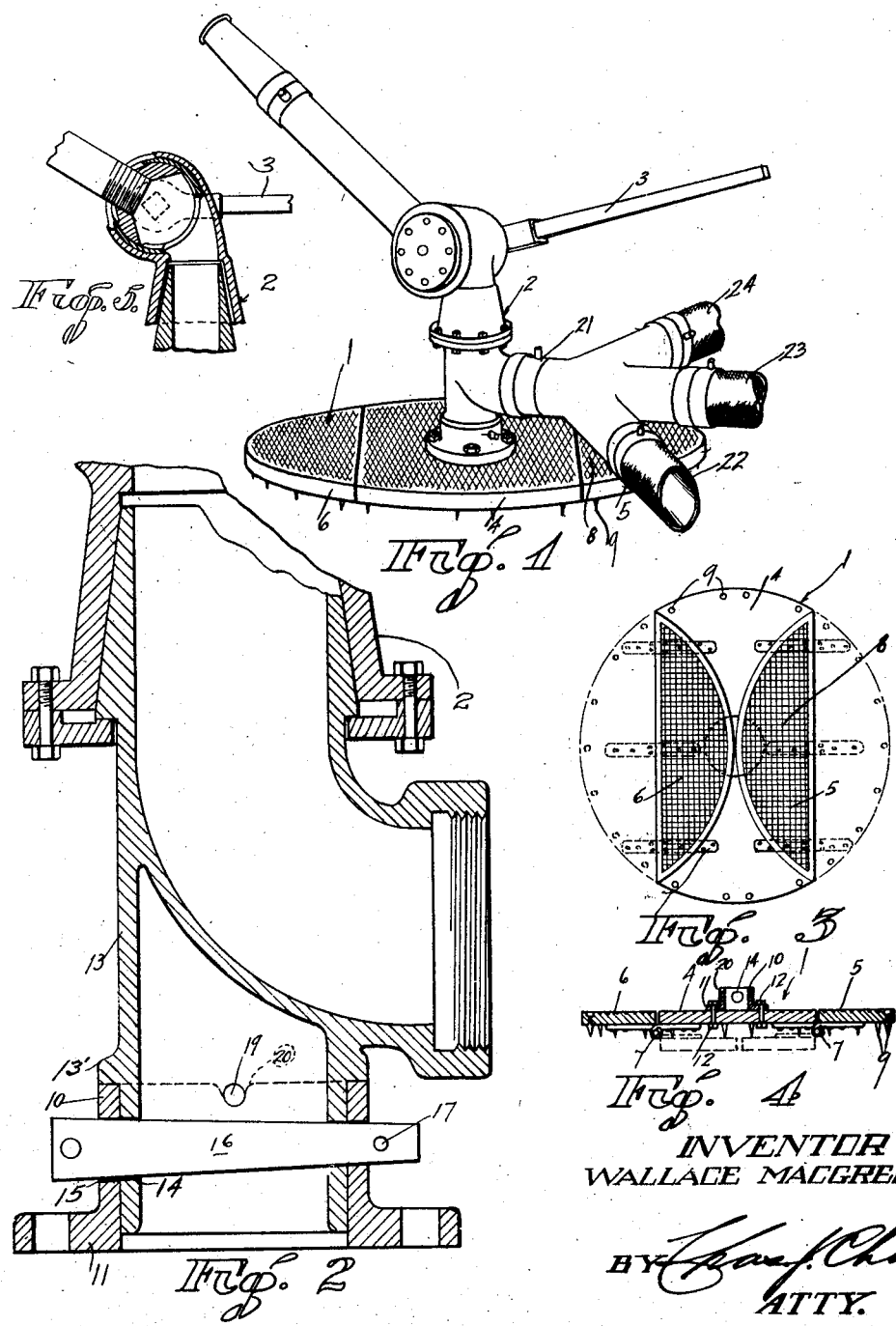
INVENTOR
WALLACE MACGREGOR
BY
ATTY.

Patented June 26, 1928.

1,674,693

UNITED STATES PATENT OFFICE.

WALLACE MACGREGOR, OF BERKELEY, CALIFORNIA.

PORTABLE FOLDING FIRE-MONITOR STAND.

Application filed October 27, 1925. Serial No. 65,097.

This invention relates to improvements in fire monitors, but more particularly to an improved stand therefor, which stand will provide for detachably and firmly supporting a fire nozzle or monitor and permit of the connection of three or more high pressure hose lines with the monitor and the desired manipulation thereof by one man instead of three or more as is the present practice.

Another object of the invention is to provide a stand of the character described which is portable and foldable, in that it is made up of hinged sections, which stand can be folded into small compass, and easily carried into and operated in narrow alleys and confined places which are ordinarily not accessible to fire engines or trucks, or placed on roofs in order to throw large streams across streets to other buildings.

A further object of the invention is to provide a simple and inexpensive stand of the character described which may be quickly placed in position for operation and which will also provide for a quick mounting of the fire nozzle or monitor in position so that it may be easily, effectively and safely operated under high pressure by but one operator.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawing:

Fig. 1 represents a perspective view of the stand of this invention as it would appear when in use.

Fig. 2 represents an enlarged vertical sectional view of a part of the monitor and stand showing the manner of mounting the monitor on the stand.

Fig. 3 represents a bottom plan view of the stand as when folded showing the same extended in dotted lines.

Fig. 4 is a vertical section through the stand, on a reduced scale.

Fig. 5 is a section through the jointed portion of the nozzle.

The embodiment of the invention shown in the accompanying drawing comprises a sectional folding plate-like stand generally designated 1, which stand is adapted to be rested upon the ground or other surface, and to support a fire nozzle or monitor as shown at 2, in such manner that the monitor or nozzle may have one or a plurality of high pressure hose lines connected thereto for delivery therefrom of a large volume of water under high pressure without requiring the attendance of more than one operator. The monitor in the present instance is one which comprises two rotary joints so arranged that the nozzle may be moved through 360° in a horizontal plane and also moved in a vertical plane over a sufficient range to meet any requirements of playing a stream of water on a conflagration. The type of monitor shown is provided with an operating handle 3, which permits of an easy manipulation of the nozzle so that it will point in the desired direction. Although I have shown a particular type of monitor or nozzle, I wish it understood that the stand of this invention is adapted for supporting various types of nozzles or monitors or fire guards, and also provides for the feeding of the nozzle, monitor or guard from one or three or more high pressure hose lines.

The sectional stand is preferably circular but may be of any other shape as desired and comprises a central section 4, to opposite sides of which foldable sections 5 and 6 are hinged as at 7. The upper sides of these sections are preferably roughened as shown at 8, and if the sections are formed of metal, this roughening of the upper surface may be effected by corrugations or a series of depressions or recesses formed in the metal sections. The size of the stand may be varied as desired, although I have found that a stand of approximately three feet in diameter is sufficiently large to be of general application to fire nozzles and the like.

Projecting from the under side of the stand adjacent the periphery thereof are a plurality of anchoring spikes 9 which have sharpened points and are adapted to bite into the supporting surface for the stand whether it be the ordinary concrete, ground, asphalt, or wood. These spikes are, for example, from an inch to an inch and a half in length and provide for firm anchoring of the stand and positively preventing its slipping on the surface on which the stand is mounted.

Mounted centrally of the stand on the upper side of the central section 4, is a socket 10 having a flange 11 secured by suitable fastenings 12 to said section. This socket is adapted to removably receive the nozzle or monitor which is to be supported by the stand.

In the present instance, the monitor is provided with a downward tubular bearing projection 13 which is adapted to engage in the socket 10. A bearing flange 13' is formed on the outer side of the projection 13 and rests upon the upper edge of the socket 10 so that the lower end of the projection is spaced from the bottom of the socket. This projection 13 is provided on opposite sides with registering tapered openings 14 which are adapted to register with similar openings 15 in the socket. A tapered pin 16 is inserted through these openings 14 and 15 to secure the monitor or nozzle on the stand. The pin is provided with an opening 17 through which a pin may be inserted to hold the pin 16 in place. To provide for a quick mounting of the monitor or nozzle on the stand, the projection 13 carries a pin or lug 19 which is adapted to engage in a notch 20 in the upper end of the socket 10. On inserting the projection 13, the pin 19 will engage the upper edge of the socket and on turning the nozzle or monitor, the pin will drop into the notch 20 and bring the openings 14 and 15 into registration, whereby the lock pin 16 may be quickly inserted in place. The nozzle or monitor in the present instance, is provided with a four-way coupling 21 adapted to receive three high pressure hose lines designated 22, 23 and 24, but four lines may be connected in this manner, if desired.

The stand is portable and subject to being readily moved from place to place. It may be folded into small compass and thereby conveniently stored and carried. This stand permits of the proper mounting and playing of a monitor or nozzle in narrow alleys and small or constricted places where it would not be practicable or possible to drive or position a fire engine or truck. By using a special form of monitor which is subject to being moved practically universally on its mounting, a plurality of high pressure streams may be delivered to the monitor and where ordinarily such an arrangement would require from three to ten men to control the pressure, in the present instance but one man is required and then only to point or change the water current in the desired direction. With this type of stand and monitor, the nozzle will remain in any position into which it is put due to the reaction of the force of the water passing through the monitor. The force of this reaction is directed in a downward path through the center of the stand and thereby stabilizes said stand.

In folding the stand, the outer sections 5 and 6 are folded under the main section 4 and the anchorage spikes are thus disposed between the folded sections so that they are shielded or guarded.

I claim:

1. In combination with a fire monitor having a bearing projection extending therefrom, of a comparatively flat stand adapted to be rested upon the ground or other support, a socket member fixed centrally upon the upper side of the stand adapted to receive said projection of the monitor, said projection and socket having registering openings therein, a pin insertable through said openings to secure the socket and projection together, said socket having a notch in its upper end and a pin on the projection adapted to engage in the notch when the openings of said socket and projection are in registration.

2. In combination with a fire monitor having a bearing projection extending therefrom, of a comparatively flat stand adapted to be rested upon the ground or other support, a socket member fixed centrally upon the upper side of the stand adapted to receive said projection of the monitor, said projection and socket having registering openings therein, a pin insertable through said openings to secure the socket and projection together, said socket having a notch in its upper end, a pin on the projection adapted to engage in the notch when the openings of said socket and projection are in registration and a shoulder on said projection engaging the upper edge of the socket.

3. The combination with an upright water conduit having a means thereon providing for attachment thereto of a fire hose, of a nozzle, joints connecting the nozzle with the water conduit and providing for movement of the nozzle both vertically and horizontally with respect to said conduit, a portable stand and means on the stand for detachably securing said conduit to and supporting the same on said stand.

4. The combination with an upright stationary water conduit having means thereon providing for attachment thereto of a fire hose, of a nozzle, joints connecting the nozzle with the water conduit and providing for movement of the nozzle both horizontally and vertically relative to the conduit, a portable stand, a downward fixed projection on the stationary upright conduit, a socket on the stand and means for detachably fastening the projection in said socket.

5. The combination with an upright stationary water conduit having means thereon providing for attachment thereto of a fire hose, of a nozzle, joints connecting the nozzle with the water conduit and providing for movement of the nozzle both horizontally and vertically, a sectional portable stand in which the sections are hinged together at points to one side of the center of the stand, a socket mounted at the approximate central point of the stand, a fixed projection on said upright conduit adapted to engage in the socket and means for detachably and non-rotatably securing the fixed projection to said socket.

WALLACE MACGREGOR.